(12) United States Patent
Hebbalalu et al.

(10) Patent No.: US 6,839,091 B1
(45) Date of Patent: Jan. 4, 2005

(54) RECOVERING DATA ENCODED IN TELEVISION SIGNALS

(75) Inventors: Kumar Satyanarayana Hebbalalu, San Jose, CA (US); Arvind Vinayak Lonkar, Santa Clara, CA (US)

(73) Assignee: Zoran Microelectronics Ltd., Haifa (IL)

( * ) Notice: Subject to any disclaimer, the term of this patent is extended or adjusted under 35 U.S.C. 154(b) by 1000 days.

(21) Appl. No.: 09/621,935

(22) Filed: Jul. 24, 2000

(51) Int. Cl.[7] .............................................. H04N 11/00

(52) U.S. Cl. ...................................... 348/465; 348/468

(58) Field of Search ................................ 348/465, 468, 348/461, 180, 194; 725/136, 137

(56) References Cited

U.S. PATENT DOCUMENTS 5,812,207 A * 9/1998 Cahill, III .................... 348/465
5,838,382 A * 11/1998 Cahill, III .................... 348/465
6,005,632 A * 12/1999 Cahill, III .................... 348/465

* cited by examiner

Primary Examiner—Victor R. Kostak
(74) Attorney, Agent, or Firm—Parsons Hsue & de Runtz LLP

(57) ABSTRACT

Recovering data (e.g., closed captioning data, teletext data) encoded in television signals. A line encoding the data is over-sampled. The resulting samples are examined to determine the average number of samples spanning the low and high values in a run-in period. The average numbers are used to determine the sampling clock and the samples which represent the encoded data. By using the two average numbers, any errors which may be otherwise encountered due to factors such as ghosting may be eliminated or avoided.

28 Claims, 7 Drawing Sheets

RECOVERING DATA ENCODED IN TELEVISION SIGNALS

BACKGROUND OF THE INVENTION

1. Field of the Invention

The present invention relates to television systems and more specifically to a method and apparatus for recovering the data encoded in television signals.

2. Related Art

Data is often encoded in television signals. Closed captioning data encoded in the non-display period of television signals is an example of such data. A broadcaster typically encodes the data according to a convention, and the data is usually recovered within television systems. The data is then used depending on the specific purpose for which it is designed. For example, the text corresponding to closed captioning data may be displayed on a display screen of a television system.

Encoding conventions often include a clock run-in signal, which generally includes zeros and ones in alternate positions. For example, before sending closed captioning data, a clock run-in signal containing 16 bits with zeros and ones in alternate positions is sent in the corresponding line. The clock run-in signal is typically used to determine the specific time points at which the television signal is to be sampled, with resulting samples representing the encoded data.

In one prior embodiment, a phase lock loop (PLL) is used to generate a sampling clock synchronized with the clock run-in signal, and the sampling clock is used to sample the accompanying television signal. Unfortunately, accurate synchronization may require expensive components such as crystals, and is thus unsuitable at least in certain environments.

Accordingly, what is required is a cost-effective method and apparatus to accurately recover the data encoded in a television signal.

SUMMARY OF THE INVENTION

The present invention enables reliable recovery of data encoded in a television signal. The television signal may contain a run-in portion and a data portion, with the data portion encoding the data to be recovered. According to an aspect of the present invention, an analog to digital converter (ADC) over-samples the two portions to generate multiple samples. A recovery circuit then recovers the encoded data and/or the sampling clock. The sampling clock determines the specific samples which represent the encoded data.

In one embodiment of the recovery circuit, a high/low averages circuit determines an avg_hi_cnt representing an average number of over-sampling clock cycles for a logical high value in said run-in portion, and an avg_lo_cnt representing an average number of over-sampling clock cycles for a logical low value in said run-in portion. A clock/data recovery circuit recovers the data and/or sampling clock.

According to another aspect of the present invention, a line average circuit generates the average (line average) of the samples values in a line. A window average circuit (operating as a low pass filter) generates an average of a prior few samples. A comparator compares the resulting average samples with the line average to generate a DCLK signal. The DCLK signal may have one logical value if an average sample is greater that the line average and another logical value otherwise.

A high/low averages circuit may determine the avg_hi_cnt and the avg_lo_cnt values by examining the DCLK signal. The average number of over-sampling clock signal periods during which the DCLK signal is high/low (in the run-in portion), may be determined to generate the two values. A clock/data recovery circuit may receive the two values, the DCLK signal, and a valid run-in signal to recover the encoded data and/or sampling clock signal.

In an embodiment, the clock/data recovery circuit contains a modulo-low counter which is incremented by one during each over-sampling clock period (when data portion is received) if the DCLK signal is at a low logical level. A modulo-high counter is incremented if the DCLK clock signal is at a high logical level. The modulo-low counter may operate based on a modulo value which equals the average value of avg_lo_cnt and an expected average number of clock cycles the DCLK should have been low (according to corresponding standards). The modulo-high counter may operate based on a modulo value which equals the average value of avg_hi_cnt and an expected average number of clock cycles the DCLK should have been high.

A pulse on the sampling clock signal may be generated each time either of the modulo counters reaches the corresponding modulo value. In addition, a boundary correction circuit may be employed to generate a pulse on the sampling clock a boundary correction circuit if the mod_hi_cnt counter is greater than or equal to a first threshold value and less than corresponding modulo value and if the DCLK signal transitions from a high logical value to a low logical value. The boundary circuit may also cause a sampling clock pulse to be generated if the mod_lo_cnt counter is greater than or equal to a second threshold value and less than corresponding modulo value and if the DCLK signal transitions from a low logical value to a high logical value.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Present Invention

Figure 1:
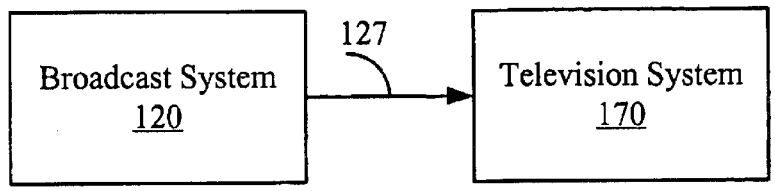
FIG. 1 is a block diagram illustrating an example environment in which the present invention can be implemented.

The present invention is described in the context of television 170 system of FIG. 1. Broadcast system 120 encodes a clock run-in signal and data in the broadcast signal. A run-in portion generally corresponds to the signal portion which is included for synchronization purpose as is well known in the relevant. For example, broadcast system 120 may encode a clock run in signal followed by closed-captioning data in line 21 of each frame of the television signal.

Television system 170 receives a television signal on broadcast path 127 and recovers the encoded data in accordance with the present invention. Even though the television signal is described as being received from broadcast system 120, it should be understood that television system 170 may receive the signals from a local system (such as a video cassette player). In addition, other types of data (e.g., teletext) may also be recovered in accordance with the present invention. Furthermore, the invention can be implemented in a system external to television system (e.g., in a set-top box system or other devices which do not interface with television systems) also.

The present invention is described below in further detail with reference to several examples for illustration. One skilled in the relevant art, however, will readily recognize that the invention can be practiced in other environments without one or more of the specific details, or with other methods, etc. In other instances, well-known structures or operations are not shown in detail to avoid obscuring the invention.

2. Method

Figure 2:
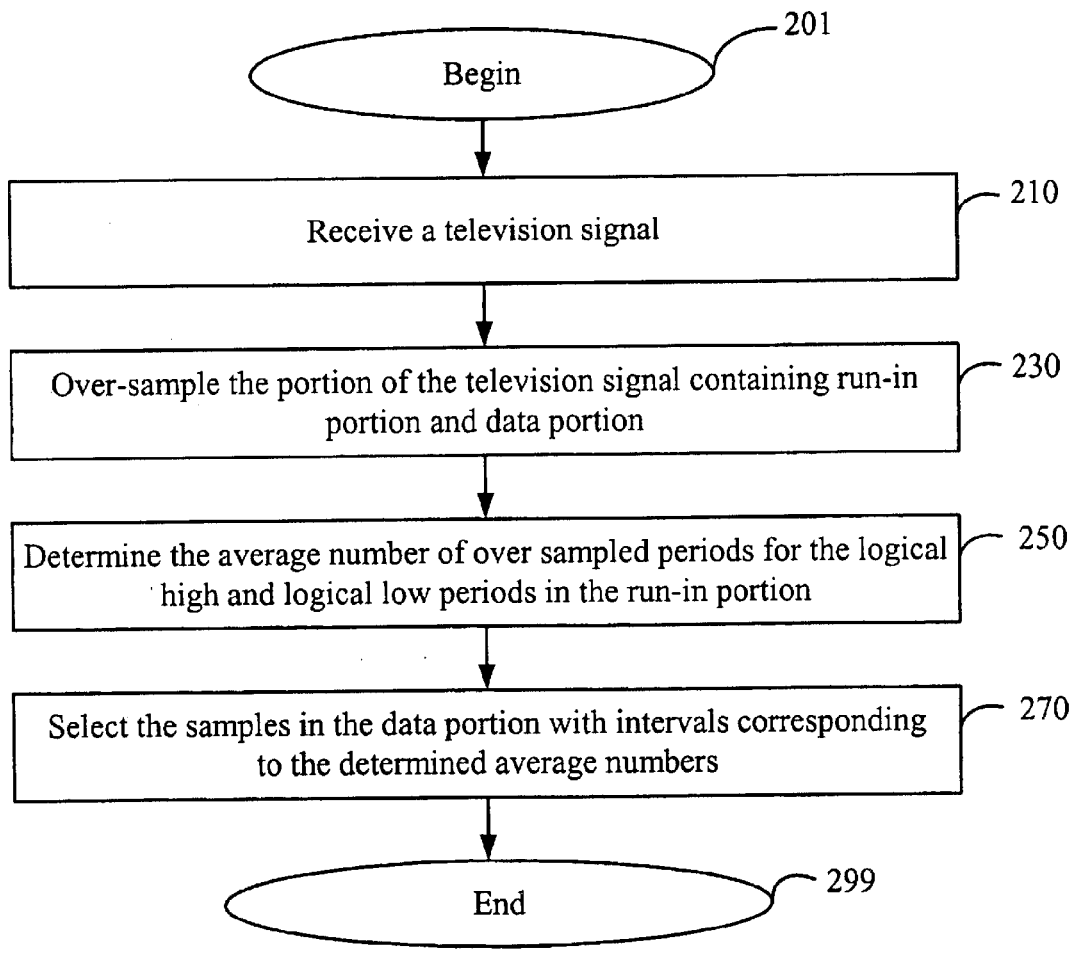
FIG. 2 is a flow chart illustrating a method in accordance with the present invention.

FIG. 2 is a flow chart illustrating a method in accordance with the present invention. The flow chart is described with reference to FIG. 1 for illustration only. The method begins in step 201 in which television system 170 receives a broadcast signal from broadcast system 120 on broadcast channel 127. The television signal may contain a run-in portion and a data portion. The data portion contains the data which needs to be recovered.

For illustration, the description is provided with reference to teletext/closed captioning data. However, the invention may be practiced in other types of environments also as will be apparent to one skilled in the relevant arts at least based on the description herein. Implementation in such other environments are also contemplated to be within the scope and spirit of the present invention.

Furthermore, only the details of teletext/closed captioning as relevant to an understanding of the disclosed embodiments are provided herein for conciseness. For further details, the reader is referred to documents entitled, "EIA-608: Recommended Practice for Line 21 Data Service" and "EIA-516: Joint EIA/CVCC Recommended Practice for Teletext: North American Basic Teletext Specification (NABTS)", which are both available from Electronic Industries Association (EIA), Engineering Department, 2001 Eye Street, N.W., Washington, D.C. 2006.

Continuing with reference to FIG. 2, in step 230, television system 170 over-samples the portion of the television signal containing run-in signal and the data portion. In general, larger over-sampling factors allows for more accurate selection of the specific samples. However, a over-sampling factor of five may be acceptable in National Television Standards Committee (NTSC) television signals encoding closed captioning data.

In step 250, television system 170 determines the average number of over-sampled periods for the logical high and logical low values in the run-in portion. In ideal conditions, the two values would be equal. However, depending on the slicing level used in the determination of whether the signal is at a high logical level or low logical level, the two numbers can differ.

In step 270, the samples representing the data encoded in the television signal are selected. Specifically, the intervals at which the samples are selected is based on both the average numbers determined in step 250. By using both the averages, the errors which may otherwise result from inaccurate selection of the slicing level (in determination of zeros and ones) may be minimized (or eliminated).

In an embodiment described below, a sampling clock signal (SCLK) is implemented such that each clock period is proportionate to one of the two average values depending on whether a zero or one is deemed to be present. The samples (generated from the over sampled clock) are selected according to the SCLK. To distinguish from the SCLK (used to select the over-sampled samples), the over-sampling clock is referred by OCLK in the present application. The description is continued with reference to further details of television system 170.

3. Television System

Figure 3:
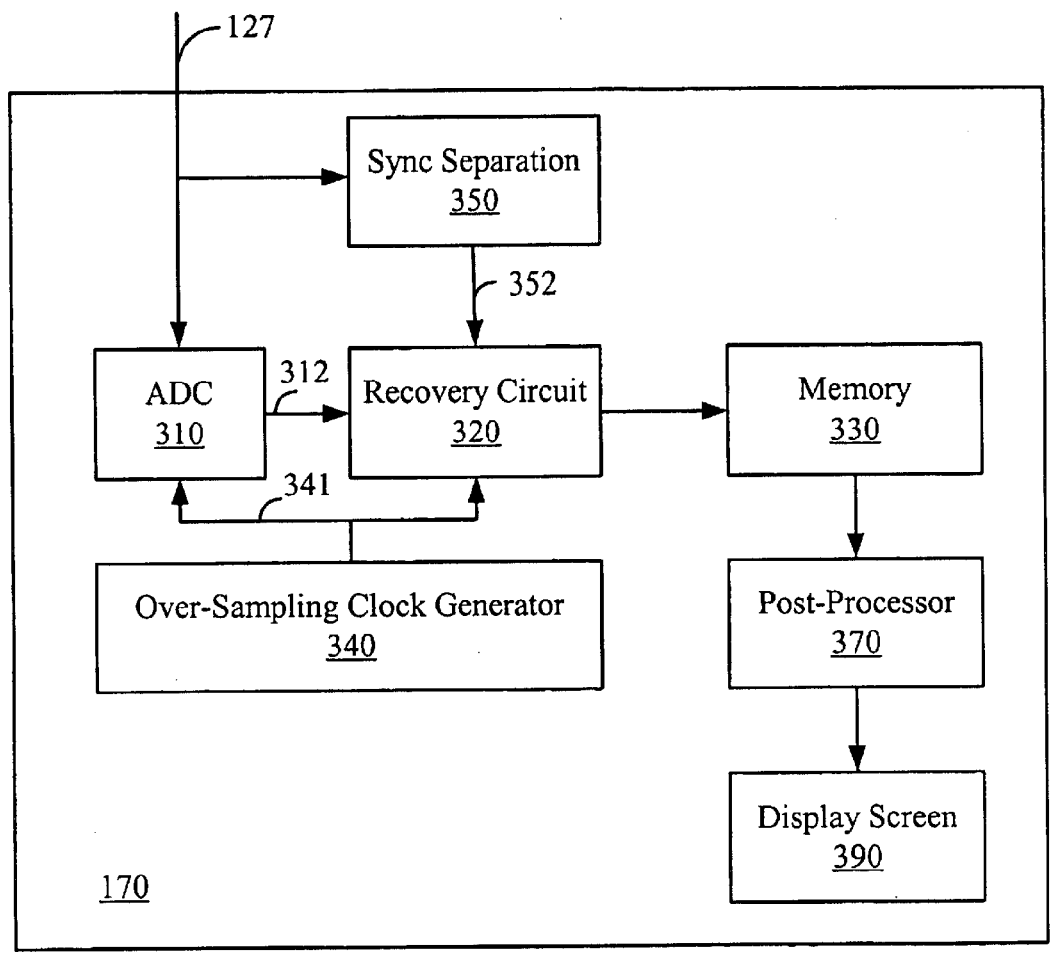
FIG. 3 is a block diagram illustrating the internals of a television system in an embodiment of the present invention.

FIG. 3 is a block diagram illustrating the details of television system 170 in one embodiment. Television system 170 is shown containing analog to digital converter (ADC) 310, recovery circuit 320, memory 330, over-sampling clock generator 340, sync separation circuit 350, post-processor 370, and display screen 390. Each component is described below in further detail.

ADC 310 receives a television signal on broadcast path 127 and over-samples at least the data and run-in portions of the television signal according to the over-sampling clock (OCLK) 341. ADC 310 may be implemented in a known way. Over-sampling clock generator 340 generates OCLK 341 signal, and may be implemented in a known way. OCLK 341 may be generated at multiple times the data encoding frequency. In an embodiment, OCLK 341 is generated at 5 times the data encoding frequency.

Sync separation circuit 350 extracts the synchronization signals from the television signal received on broadcast path 127 and provides the synchronization signals to recovery circuit 320. In an alternative embodiment, sync separation circuit 350 provides the synchronization signals to over-sampling clock generator 340 also.

Recovery circuit 320 receives the samples generated by ADC 310 on path 312, and recovers the data encoded in the data portion of television signal received on path 127. Alternatively (or in addition), recovery circuit 320 may merely select one of the samples corresponding to each encoded data element, and provide the data element to memory 330. An embodiment of recovery circuit 320 is described below in further detail with reference to FIG. 4. Memory 330 may correspond to any conventional random access memory (RAM).

Post-processor 370 processes the recovered data and potentially displays the data (in the case of closed captioning data) on display screen 390. The images encoded in the television signal are also usually displayed even though the corresponding connections are not shown in FIG. 3. The manner in which recovery circuit 320 may recover the encoded data is described below in further detail.

4. Recovery Circuit

Figure 4:
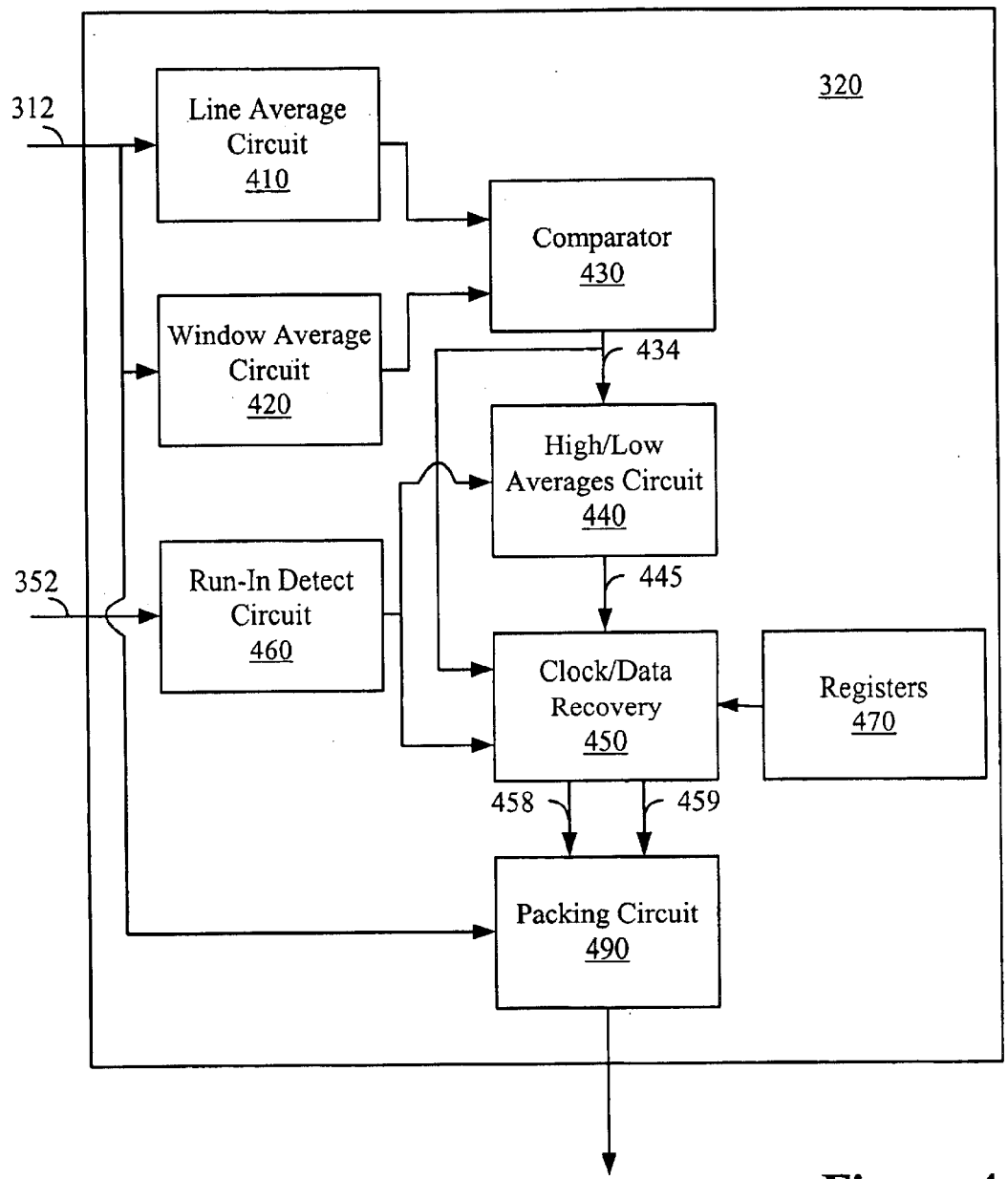
FIG. 4 is a block diagram illustrating the details of a recovery circuit which recovers the encoded data and sampling clock in an embodiment of the present invention.

FIG. 4 is a block diagram illustrating the details of recovery circuit 320 in an embodiment of the present invention. Recovery circuit 320 is shown containing line average circuit 410, window average circuit 420, comparator 430, high/low averages circuit 440, clock/data recovery 450, run-in detect circuit 460, registers 470, and packing circuit 490. Even though not shown, all the components are clocked by OCLK (over-sampling clock). Each component is described below in further detail.

Line average circuit 410 receives the samples (generated by over-sampling) on path 312, and computes the average (line_avg) of the samples for each line. In one embodiment, line_avg is computed based on samples related to each group of four lines. Line average circuit 410 may be implemented in a known way.

Window average circuit 420 computes the average (curr_avg) of the samples in a sliding window within the run-in portion. In one embodiment, the sliding window contains six samples. The implementation of the sliding window may require five delay elements connected in serial. The average of the outputs of the five delay elements and a presently received sample may be computed to generate curr_avg for each OCLK clock period as is well known in the relevant arts.

Comparator 430 receives line_avg and curr_avg from line average circuit 410 and window average circuit 420 respectively, and generates DCLK 434 which has a high logical value if curr_avg is greater than line_avg, and low logical value otherwise. In other words, comparator 430 operates as a slicer, with line_avg being used as the slicing level. Line average circuit 410, window average circuit 420 and comparator 430 together operate as a low pass filter.

Run-in detect circuit 460 receives synchronization signals on path 352, and generates a signal (valid run-in) having one logical value if a run-in signal is expected at the present time, and another logical value otherwise. Run-in detect circuit 460 may be implemented based on an understanding of the encoding format which is followed at broadcast system 120. In an embodiment, run-in detect circuit 460 is implemented as a state machine.

High/low averages circuit 440 computes the average number of OCLK cycles in which DCLK 434 is at a high logical value (avg_hi_cnt) and low logical value (avg_lo_cnt) during the clock run-in cycle (as specified by the output of run-in detect circuit 460). In general, high/low averages circuit 440 examines the state of DCLK 434 during each OCLK clock cycle to determine whether DCLK 434 is at a high logical level or low logical level. A counter is maintained for each of the logical levels. At the end of run-in portion for each data line, average values (avg_hi_cnt and avg_lo_cnt) are generated.

Clock/data recovery 450 may receive as inputs the two average values from high/low averages circuit 440, DCLK 434 and the output of run-in detect circuit 460. Clock/data recovery 450 may generate SCLK (sampling clock) 458 and data bit stream 459 by examining the inputs. SCLK generally specifies the specific samples to be selected and data bit stream contains the bits recovered from the television signal. Some of the parameters in generating the two outputs may be stored in registers 470. An embodiment of clock/data recovery circuit 450 is described below in further detail.

Packing circuit 450 receives SCLK 458 and data bit stream 459 from clock/data recovery circuit 450, and the samples resulting from over-sampling on path 312. Packing circuit 450 may pack the recovered bits into bytes/words suitable for storing in memory 330. In addition to or in the alternative, packing circuit 450 may select the samples (from those received on path 312) as specified by SCLK 458. The selection of samples enables operations such as equalization by post-processor 370 as is well known in the relevant arts.

Thus, recovery circuit 320 enables the data encoded in television signals to be recovered. The description is continued with reference to an example embodiment of clock/data recovery circuit 450.

5. Clock/Data Recovery Circuit

Figure 5:
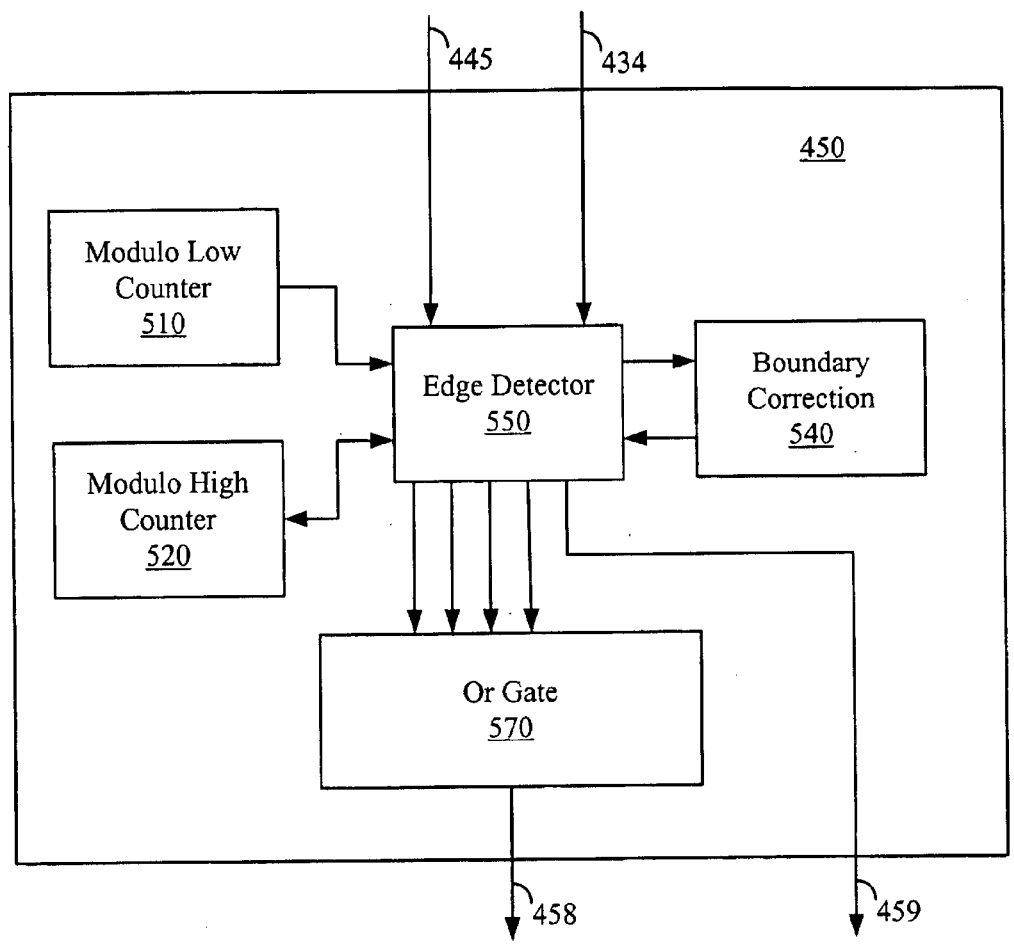
FIG. 5 is a block diagram illustrating the details of a clock/data recovery circuit which is used to recover the encoded data and sampling clock in an embodiment of the present invention.

FIG. 5 is a block diagram illustrating the details of clock/data recovery circuit 450 in one embodiment. Clock/data recovery circuit 450 is shown containing modulo low counter 510, modulo high counter 520, boundary correction 540, edge detector 550, and or gate 570. Each component is described below in further detail below.

Edge detector 550 increments the value in modulo low counter 510 if DCLK 434 is low in the present OCLK clock cycle. In one embodiment, modulo low counter 510 operates based on a modulo value of the average of the avg_lo_cnt determined by high/low averages circuit 440 and the expected average value (as specified by the corresponding standard), and rounding the average to the nearest integer. The output of modulo low counter 510 is referred to as mod_lo_cnt in the present application. Modulo low counter 510 generates a '1' after DCLK 434 is low for a number of OCLK clock cycles equal to the modulo value.

Similarly the value in modulo high counter 520 is incremented if DCLK 434 is high in the present OCLK clock cycle. Modulo high counter 520 may operate based on a module value of the average of the avg_high_cnt and the expected average value as specified by the corresponding standard. The output of modulo high counter is referred to as mod_hi_cnt in the present application.

Edge detector 550 generate two signals, solid_lo and solid_hi signals. The solid_hi signal is generated at a high logical value when mod_hi_cnt equals avg_hi_cnt (i.e., when the modulo high counter 520 returns to zero) and when DCLK 434 is at a high logical value. The solid_lo signal is generated at a high logical value when DCLK 434 is low and when mod_lo_cnt equals avg_lo_cnt.

Boundary correction 540 generates two signals delay_hi and delayed_lo. Delay_hi represents a time instance in which a SCLK clock cycle is to be generated even though the modulo high counter 520 has not reached the corresponding modulo value. For example, when a sequence of ones is followed by a zero, the modulo high counter 520 may have a value of 4 (when module value equals 5) at the time of the transition and it may be desirable to generate a SCLK sampling point at the time of transition from one to zero. The delay_hi signal is raised to a high logical value at the corresponding time point. The delay_lo signal operates similarly, but corresponds to transitions from low to high logical values.

Or gate 570 generates SCLK 458 by performing a OR logical operation on the four inputs—solid_lo, solid_hi, delayed_hi and delayed_low. It should be understood that an SCLK clock signal generated for the situations when a zero or one is deemed to be encoded (in the television signal) based on the examination of the DCLK signal. Thus, recovery circuit 320 may be used to generate SCLK, which specifies the specific time points at which the television signal has to be sampled to recover the encoded data. The description is continued with respect to several timing diagrams which illustrate the relationship among various signals described above.

6. Timing Diagrams

Figure 6:
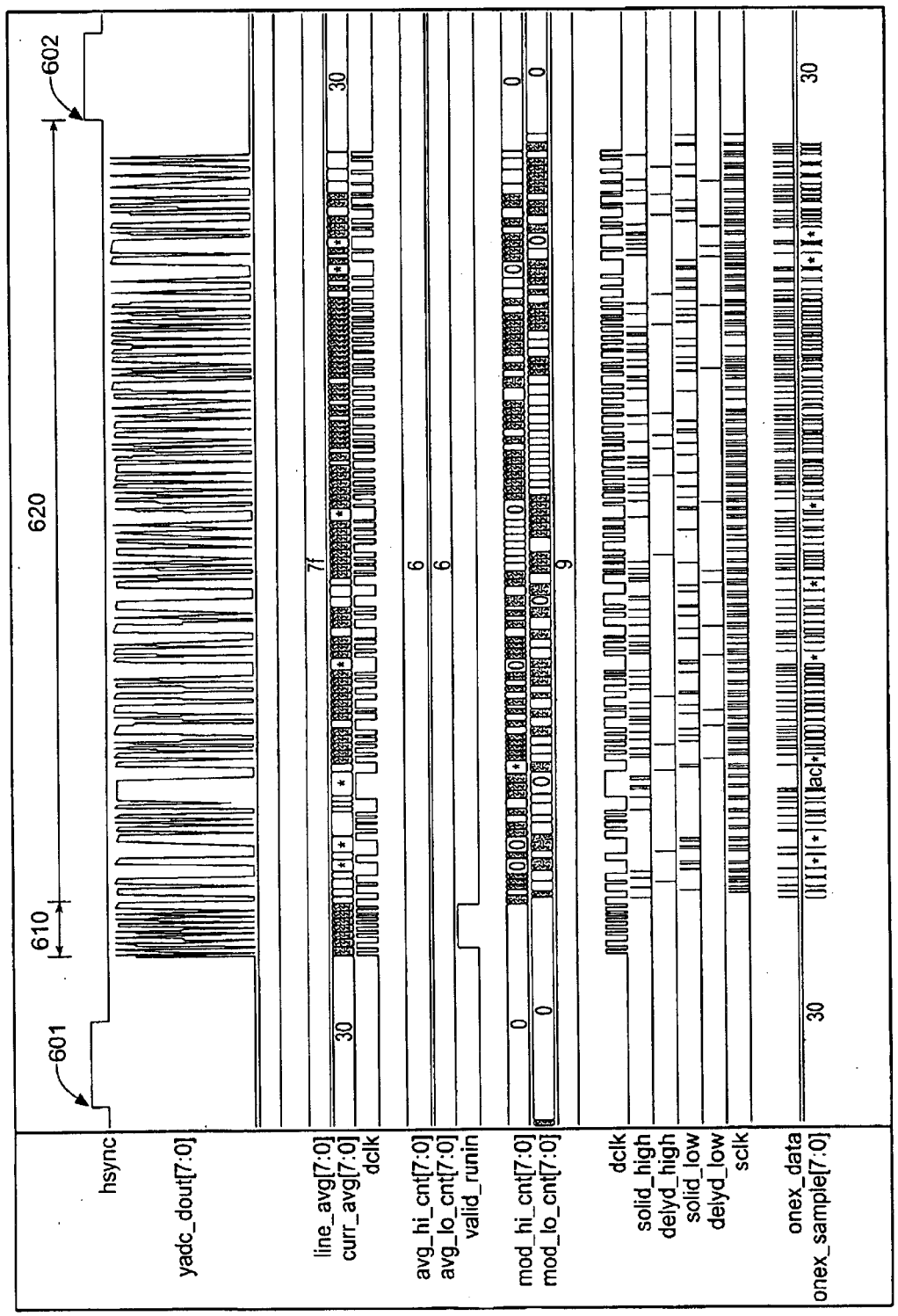
FIG. 6 is a timing diagram depicting the state of various signals in run-in period and data encoding period in an embodiment of the present invention.

FIG. 6 is a graph illustrating the relative state of different signals described above. HSYNC signal is shown with HSYNC pulses at time points 601 and 602. As is well known, a HSYNC pulse indicates a transition to a next horizontal line and the run-in signal starts at a pre-specified duration after the HSYNC pulse. Portion 610 represents the run-in signal portion as indicated by a high logical value on valid_runin signal. The rest of the line (portion 620) contains encoded data, which may be recovered according to an aspect of the present invention. Even though a low pass filter is applied to the television signal, DCLK is shown closely tracking the television signal.

Figure 7:
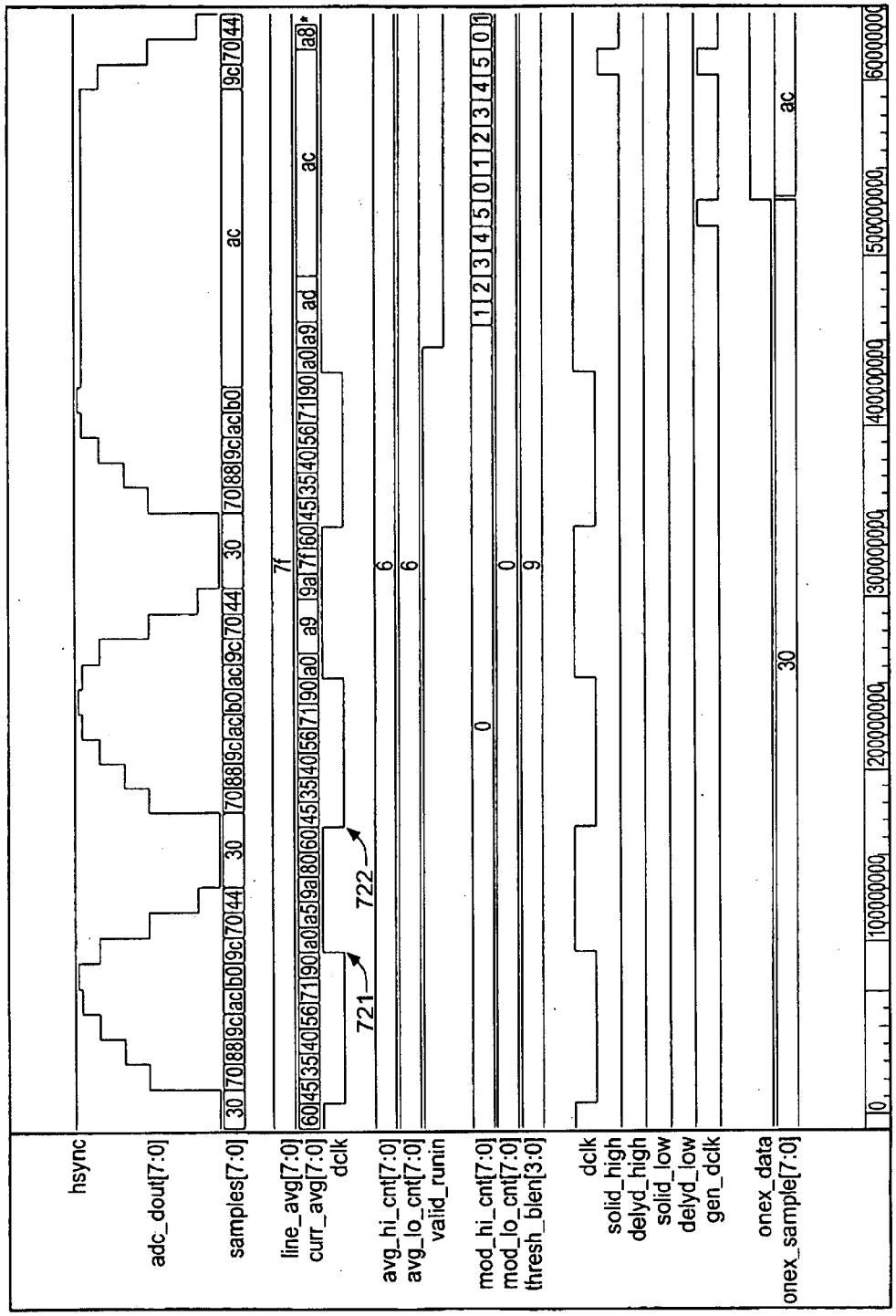
FIG. 7 is a timing diagram depicting in further detail the state of various signals in run-period in an embodiment of the present invention.

FIG. 7 is a graph depicting the state of the signals in further detail in run-in portion 610. The output values of ADC 310 and the corresponding (over) sample values are shown. The line average is shown remaining constant (7F) within a given line. The values on curr_avg (of the window of 5 samples) are also shown.

DCLK is shown going higher at 721 as the previous sample on curr_avg (90) exceeded the line average 7F. DCLK is shown going lower at 722 as the previous sample on curr_avg (60) is shown being less than line average 7F. The avg_hi_cnt and avg_lo_cnt are shown equal to '6'. However the two numbers may be unequal, particulary in the presence of noise.

Figure 8:
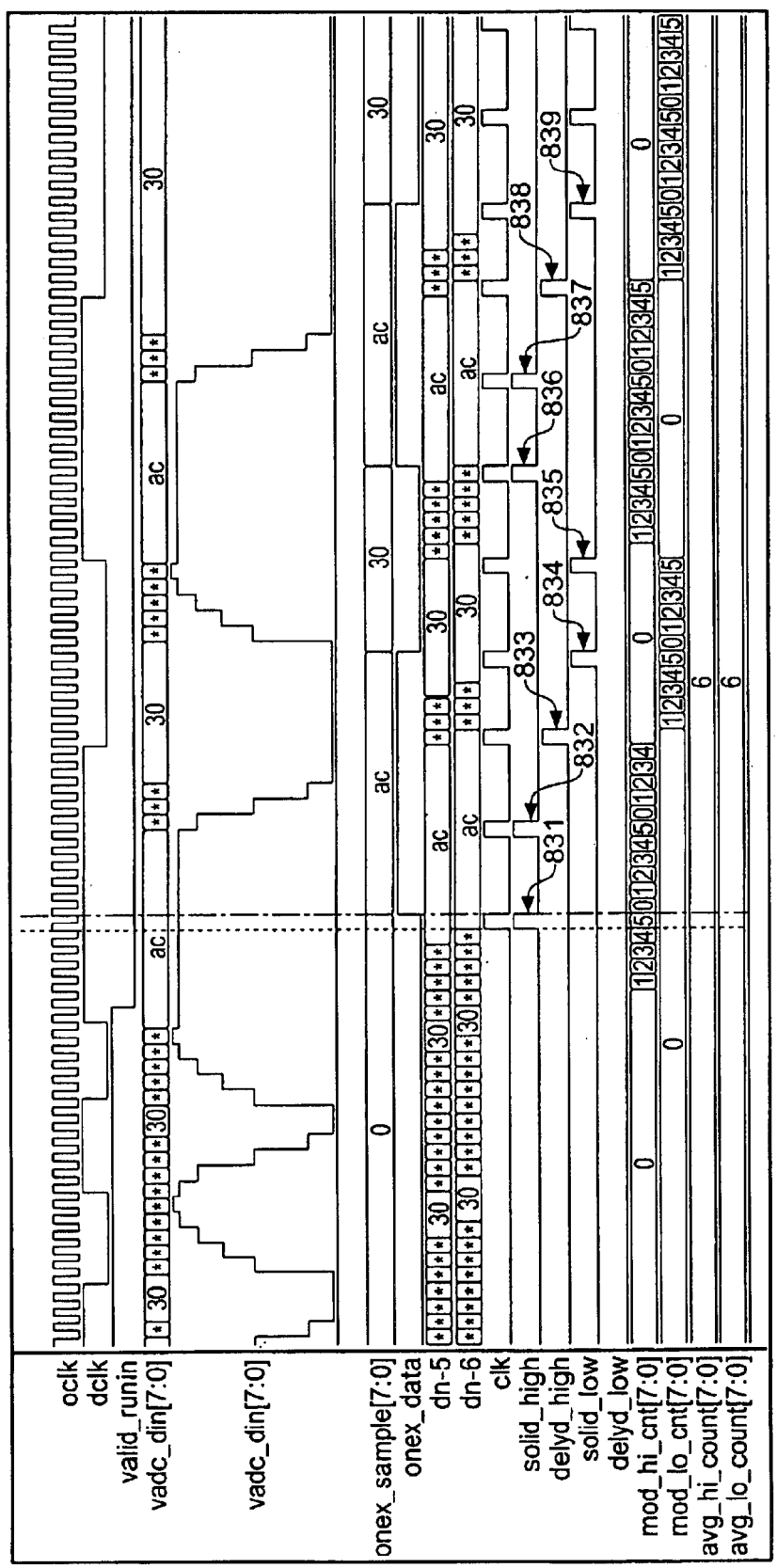
FIG. 8 is a timing diagram depicting in further detail the state of various signals in data period in an embodiment of the present invention.

FIG. 8 is a graph depicting the state of the signals in further detail in data portion 620. The solid_high signal is shown at high logical value at time points 831, 832, 836 and 837. As may be readily observed, DCLK signal is at a high value and the mod_hi_cnt has reached modulo value (5) at the corresponding time points. Solid_lo signal is at a high value 834 and 835. The DCLK signal is at a low logical value and mod_lo_cnt has reached the corresponding modulo low count (6) at the corresponding time points.

Delayed_high is shown at a high logical value at time point 833. As may be noted, DCLK has a low logical value prior to that corresponding OCLK clock period and mod_hi_cnt equals 4. Accordingly, boundary correction 540 generates the delayed_high pulse, which in turn causes an SCLK pulse to be generated.

SCLK is generated based on an OR logical operation of the delayed_high, delayed_low, solid_high and solid_low signals. Accordingly, the SCLK pulses are shown at each of the time points 831–839. The data on the data bit stream 459 is shown as Onex_data. The DCLK value at the time of the SCLK pulse is provided as the onex_data.

Onex_sample represents the corresponding sample value which may be passed to memory 330 for post-processing. Dn_5 and dn_6 represent the over-sampled samples delayed respectively by five and six OCLK clock cycles. Onex_sample is generated by selecting the value at the time points specified by the OCLK signal.

Thus, recovery circuit 320 may be used to recover the encoded data or generate the samples as determined by SCLK.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of recovering a plurality of data elements encoded in a data portion of a television signal, said television signal further containing a run-in portion encoding a run-in signal, said method comprising:

over-sampling said run-in portion using an over-sampling clock to generate a plurality of samples;

determining an avg_hi_cnt representing an average number of over-sampling clock cycles for a logical high value in said run-in portion; and determining an avg_lo_cnt representing an average number of over-sampling clock cycles for a logical low value in said run-in portion, wherein said avg_lo_cnt and said avg_hi_cnt are used to recover said plurality of data elements.

2. The method of claim 1, further comprising selecting some of said plurality of samples as representing said plurality of data elements, wherein said some of said plurality of samples are selected based on intervals corresponding to said avg_hi_cnt and said avg_lo_cnt.

3. The method of claim 2, said intervals are determined by said avg_lo_cnt if a data element is determined to be at a low logical value and by said avg_hi_cnt if a data element is determined to at a high logical value.

4. The method of claim 3, further comprising:

passing said plurality of samples through a low pass filter to generate a plurality of filtered samples;

generating a line average, wherein said line average represents the average of said plurality of samples corresponding to at least one line; and generating a DCLK clock signal by comparing said line average with said plurality of filtered samples, wherein said DCLK clock signal is at one logical level if said line average is greater that a filtered sample and at another logical value otherwise, wherein said avg_lo_cnt and said avg_hi_cnt are determined based on examination of said DCLK signal.

5. The method of claim 4, further comprising:

maintaining a mod_hi_cnt counter and a mod_lo_cnt counter operating with a respective modulo value equal to said avg_hi_cnt and said avg_lo_cnt;

incrementing said mod_hi_cnt counter if said DCLK clock signal is determined to be at a high logical value in a clock cycle of said over-sampling clock;

incrementing said mod_lo_cnt counter if said DCLK clock signal is determined to be at a low logical value in a clock cycle of said over-sampling clock; and generating a sampling clock pulse if either said mod_hi_cnt counter or said mod_lo_cnt counter reaches a corresponding modulo value, wherein said sampling clock determines a plurality of time points at which said television signal represents said plurality of data elements encoded in said television signal.

6. The method of claim 5, further comprising:

generating a sampling clock pulse if said mod_hi_cnt counter is greater than or equal to a first threshold value and less than corresponding modulo value and if said DCLK signal transitions from a high logical value to a low logical value; and generating a sampling clock pulse if said mod_lo_cnt counter is greater than or equal to a second threshold value and less than corresponding modulo value and if said DCLK signal transitions from a low logical value to a high logical value.

7. The method of claim 5, wherein said over-sampling clock has a frequency of at least four times said sampling clock signal.

8. The method of claim 4, wherein said passing comprises generating an average value of a previous plurality of samples to generate one of said filtered sample.

9. The method of claim 1, wherein said method is implemented in either a television system or a set-top box.

10. A system recovering a plurality of data elements encoded in a data portion of a television signal, said television signal further containing a run-in portion encoding a run-in signal, said system comprising:
- a clock generator generating an over-sampling clock signal;
- an analog to digital converter (ADC) over-sampling said run-in portion using said over-sampling sampling clock signal to generate a plurality of samples;
- a high/low averages circuit determining an avg_hi_cnt representing an average number of over-sampling clock cycles for a logical high value in said run-in portion, said high/low averages circuit determining an avg_lo_cnt representing an average number of over-sampling clock cycles for a logical low value in said run-in portion; and
- a recovery circuit using said avg_lo_cnt and said avg_hi_cnt to recover said plurality of data elements.

11. The system of claim 10, wherein said recovery circuit selects some of said plurality of samples as representing said plurality of data elements, wherein said some of said plurality of samples are selected based on intervals corresponding to said avg_hi_cnt and said avg_lo_cnt.

12. The system of claim 10, wherein said recovery circuit comprises an edge detector determining a sampling interval based on said avg_lo_cnt if a data element is determined to be at a low logical value and by said avg_hi_cnt if a data element is determined to at a high logical value, wherein said sampling interval determines a sampling point to recover one of said plurality of data elements.

13. The system of claim 12, further comprising a low pass filter processing said plurality of samples to generate a plurality of filtered samples.

14. The system of claim 12, further comprising:
- a line average circuit generating a line average, wherein said line average represents the average of said plurality of samples corresponding to at least one line; and
- a comparator generating a DCLK clock signal by comparing said line average with said plurality of filtered samples, wherein said DCLK clock signal is at one logical level if said line average is greater that a filtered sample and at another logical value otherwise,
- wherein said recovery circuit determines said avg_lo_cnt and said avg_hi_cnt based on said DCLK signal.

15. The system of claim 14, wherein said recovery circuit further comprises a mod_hi_cnt counter and a mod_lo_cnt counter operating with a respective modulo value equal to said avg_hi_cnt and said avg_lo_cnt, wherein said mod_hi_cnt counter is incremented if said DCLK clock signal is determined to be at a high logical value in a clock cycle of said over-sampling clock, and said mod_lo_cnt counter is incremented if said DCLK clock signal is determined to be at a low logical value in a clock cycle of said over-sampling clock,
- wherein said recovery circuit generates a sampling clock if either said mod_hi_cnt counter or said mod_lo_cnt reaches a corresponding modulo value, wherein said sampling clock determines a plurality of time points at which said television signal represents said plurality of data elements encoded in said television signal.

16. The system of claim 14, further comprising a boundary correction circuit causing a sampling clock pulse to be generated if said mod_hi_cnt counter is greater than or equal to a first threshold value and less than corresponding modulo value and if said DCLK signal transitions from a high logical value to a low logical value, said boundary circuit further causing a sampling clock pulse to be generated if said mod_lo_cnt counter is greater than or equal to a second threshold value and less than corresponding modulo value and if said DCLK signal transitions from a low logical value to a high logical value.

17. The system of claim 15, wherein said over-sampling clock has a frequency of at least four times said sampling clock signal.

18. The system of claim 10, wherein said system comprises either a television system or a set-top box.

19. A circuit for use in a system, said circuit recovering a plurality of data elements encoded in a data portion of a television signal, said television signal further containing a run-in portion encoding a run-in signal, said system comprising:
- a clock generator generating an over-sampling clock signal;
- an analog to digital converter (ADC) over-sampling said run-in portion using said over-sampling clock signal to generate a plurality of samples;
- a high/low averages circuit determining an avg_hi_cnt representing an average number of over-sampling clock cycles for a logical high value in said run-in portion, said high/low averages circuit determining an avg_lo_cnt representing an average number of over-sampling clock cycles for a logical low value in said run-in portion; and
- a recovery circuit using said avg_lo_cnt and said avg_hi_cnt to recover said plurality of data elements.

20. The circuit of claim 19, wherein said recovery circuit selects some of said plurality of samples as representing said plurality of data elements, wherein said some of said plurality of samples are selected based on intervals corresponding to said avg_hi_cnt and said avg_lo_cnt.

21. The circuit of claim 19, wherein said recovery circuit comprises an edge detector determining a sampling interval based on said avg_lo_cnt if a data element is determined to be at a low logical value and by said avg_hi_cnt if a data element is determined to at a high logical value, wherein said sampling interval determines a sampling point to recover one of said plurality of data elements.

22. The circuit of claim 21, further comprising a low pass filter processing said plurality of samples to generate a plurality of filtered samples.

23. The circuit of claim 21, further comprising:
- a line average circuit generating a line average, wherein said line average represents the average of said plurality of samples corresponding to at least one line; and
- a comparator generating a DCLK clock signal by comparing said line average with said plurality of filtered samples, wherein said DCLK clock signal is at one logical level if said line average is greater that a filtered sample and at another logical value otherwise,
- wherein said recovery circuit determines said avg_lo_cnt and said avg_hi_cnt based on said DCLK signal.

24. The circuit of claim 23, wherein said recovery circuit further comprises a mod_hi_cnt counter and a mod_lo_cnt counter operating with a respective modulo value equal to said avg_hi_cnt and said avg_lo_cnt, wherein said mod_hi_cnt counter is incremented if said DCLK clock signal is determined to be at a high logical value in a clock cycle of said over-sampling clock, and said mod_lo_cnt counter is incremented if said DCLK clock signal is determined to be at a low logical value in a clock cycle of said over-sampling clock,
- wherein said recovery circuit generates a sampling clock if either said mod_hi_cnt counter or said mod_lo_cnt reaches a corresponding modulo value, wherein said sampling clock determines a plurality of time points at which said television signal represents said plurality of data elements encoded in said television signal.

25. The circuit of claim 23, further comprising a boundary correction circuit causing a sampling clock pulse to be generated if said mod_hi_cnt counter is greater than or equal to a first threshold value and less than corresponding modulo value and if said DCLK signal transitions from a high logical value to a low logical value, said boundary circuit further causing a sampling clock pulse to be generated if said mod_lo_cnt counter is greater than or equal to a second threshold value and less than corresponding modulo value and if said DCLK signal transitions from a low logical value to a high logical value.

26. The circuit of claim 24, wherein said over-sampling clock has a frequency of at least four times said sampling clock signal.

27. The circuit of claim 19, wherein said system comprises either a television system or a set-top box.

28. A circuit for use in a system, said circuit recovering a plurality of data elements encoded in a data portion of a television signal, said television signal further containing a run-in portion encoding a run-in signal, said system comprising:

means for generating an over-sampling clock signal;

over-sampling means for over-sampling said run-in portion using said over-sampling clock signal to generate a plurality of samples;

means for determining an avg_hi_cnt representing an average number of over-sampling clock cycles for a logical high value in said run-in portion;

means for determining an avg_lo_cnt representing an average number of over-sampling clock cycles for a logical low value in said run-in portion; and a recovery circuit using said avg_lo_cnt and said avg_hi_cnt to recover said plurality of data elements.

* * * * *

UNITED STATES PATENT AND TRADEMARK OFFICE
CERTIFICATE OF CORRECTION

PATENT NO. : 6,839,091 B1
DATED : January 4, 2005
INVENTOR(S) : Hebbalalu et al.

It is certified that error appears in the above-identified patent and that said Letters Patent is hereby corrected as shown below:

Column 9,
Line 8, after "over-sampling" and before "clock" delete "sampling".

Signed and Sealed this

Second Day of May, 2006

JON W. DUDAS
*Director of the United States Patent and Trademark Office*